Dec. 30, 1952   J. N. BAKER   2,623,386
ELECTRIC STRAIN GAUGE
Filed July 8, 1948

Inventor
James N. Baker
By Thomas W. Y. Clark
Attorney

Patented Dec. 30, 1952

2,623,386

UNITED STATES PATENT OFFICE 2,623,386

ELECTRIC STRAIN GAUGE

James N. Baker, Towson, Md., assignor to The Black and Decker Manufacturing Company, a corporation of Maryland Application July 8, 1948, Serial No. 37,669

4 Claims. (Cl. 73—141)

This invention relates to an improvement in an electric gage of the inductive type wherein changes in the reluctance of the gap structure are reflected upon the induction of the electromagnetic system, such changes being subject to indication by suitable measuring means. The instruments heretofore made have enabled a reading to be made of what might be termed material under tension or compression. By this invention the reading can be made of what may be termed material under deflection. The beams or elements, the deflection of which has heretofore been read to measure the amount of the deflecting force, have had the electro-magnetic means attached either at the top or bottom, usually the latter. Because of the crowded conditions under which such beams are sometimes mounted it has been most desirable to place an electro-magnetic gage on the side of the beam to measure its deflection rather than the top or bottom to measure the compression or tension, and the devices heretofore used for such purposes, it has been found, cancelled out each other in their inductive effect unless very elaborate changes were made in the recording apparatus.

According to the present invention two electro-magnets are used which, rather than cancelling one another, give an increased variation in the reluctance of the total air gap structure.

Another object of the invention is to make a very simple rigid gage, that will not get out of order and that will be inexpensive to manufacture, install and maintain, as well as giving a maximum variation in current for a given strain to be measured.

Other objects and advantages of the invention will be apparent from the following description and the accompanying drawings forming a part hereof and in which.

In the drawings similar numerals refer to similar parts throughout the several views.

Figure 2:
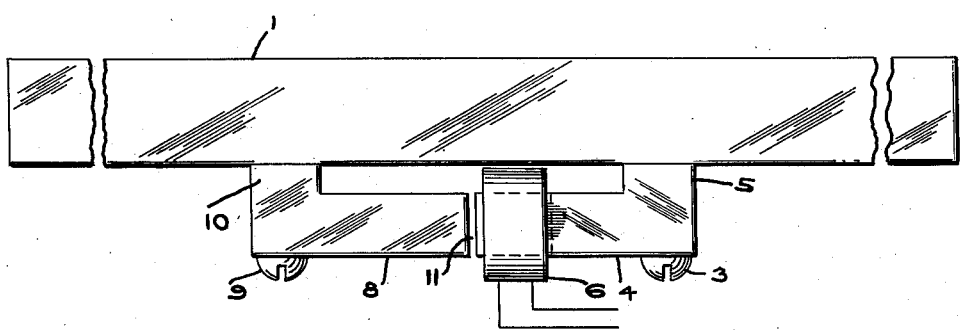
Figure 2 is top plan view thereof.
Figure 1:
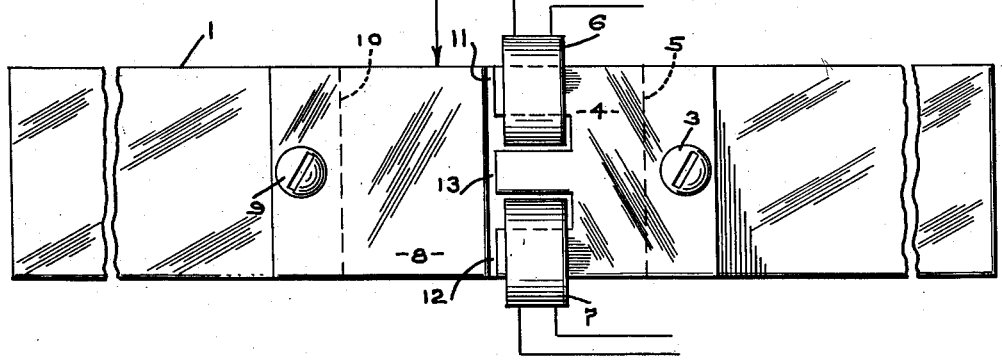
Figure 1 is a side elevation of the gage.

The beam or element 1 is supported near its ends to receive a thrust at approximately the position indicated by the arrow 2.

This thrust tends to bend the beam along a horizontal center plane, to compress the beam at the top and to expand it at the bottom.

Rigidly attached to the beam at one end, at one side of the point of thrust, as by a screw 3 is an arm 4 of magnetic material which has a base 5 which spaces the free end of the arm 4 from the beam. This free end of the arm 4 terminates in three spaced parallel prongs, the arm thus having the shape of an inverted E. The outer members of the prong, or the top and bottom of the E, have electrically energized coils 6 and 7 on them, the prongs forming cores which, with the coils, form two electro-magnets, the cores of which are preferably equidistant from a horizontal plane passing through the center of the beam 1. The leads of coils 6 and 7 are connected to a suitable source of alternating current and to indicating mechanism. On the other side of the point of application of the load is rigidly mounted an armature 8, shown mounted by screw 9 and spaced from beam 1 by means of base 10. It will be apparent, since these members, the arm and its electro-magnets and the armature, are spaced equally from a horizontal plane through the center of beam 1, that the flexing of the beam or element 1 under pressure of a load between the points of attachment of the arm and armature to the beam tends to close the upper air gap 11 proportionately to opening the lower air gap 12 formed between the armature and the electro-magnets formed by the cores and coils 6 and 7 respectively. The additional air gap 13, by this flexing is made smaller at the top and larger at the bottom and likewise influences the current variation in the coils.

The variation of the current in the coils 6 and 7 caused by this variation of the air gaps is of course directly proportional to the forces exerted to bend or deform the beam or element 1 and that variation of current in these coils 6 and 7 with suitable recording apparatus may be measured to give an accurate indication of the force applied in the flexing of the beam or element 1.

It will be apparent that a very rugged and accurate gage has been produced and that many variations in its detailed structure may be made without departing from the invention as defined in the following claims.

What is claimed as new and is desired to be secured by Letters Patent is:

1. In a magnetic strain gage for measuring the bending moment on a beam-like element, the element being disposed to receive forces normal to its longitudinal axis to bend it and in which the gage comprises an arm of magnetic material having one end rigidly attached to the element and the other end terminating in spaced substantially parallel prongs all lying in a single plane and spaced from the element, separate electric coils on two of said spaced prongs, the prongs and coils forming separate electro-magnets, a single one piece armature rigidly mounted at one end on said element, the other end being spaced from the element and positioned opposite to and closely facing all said prongs, the armature and arm being aligned and extending parallel to the element's longitudinal axis, the bending forces being applied to the element in a direction parallel to the plane of the prongs, the gage being within the area of the bend, whereby bending the element in a plane parallel to the plane of the prongs separates one magnet from the armature and moves the other toward the armature, thereby varying a current passed through the coils.

2. In combination, a longitudinally extending beam-like element, the element being disposed to receive a force normal to its longitudinal axis to bend it, a magnetic strain gage for measuring the bending moment of the force on said element comprising an arm of magnetic material extending longitudinally of the element and connected at one end thereto on one side of the application of force thereto, the other end of the arm being spaced from the element and terminating in spaced substantially parallel prongs, all lying in a single plane and two being equally spaced from the longitudinal center of the element, separate electric coils on said two prongs, the prongs and coils forming separate electro-magnets, a single one piece armature extending longitudinally of the element and connected at one end thereto on the other side of the application of force thereto, the other end of the armature being spaced from the element and closely facing both said electro-magnets, said force being applied to the element in a direction parallel to the plane of the prongs, and substantially at right angles to the length of the element, whereby bending the element moves the armature relatively to the magnets toward one and from the other, and thereby varies a current passed through the coils.

3. In combination, a longitudinally extending beam-like element, of substantially uniform cross-sectional area, the element being disposed to receive a force normal to a plane through its longitudinal center to bend it, a magnetic strain gage for measuring the bending moment of the force on said element comprising an arm of magnetic material extending longitudinally of the element and connected at one end thereto on one side of the application of force thereto, the other end of the arm being spaced from the element and terminating in three spaced parallel prongs, all lying in a plane at right angles to said first plane, the outer two being equally spaced from said first plane, separate electric coils on said two prongs, the prongs and coils forming separate electro-magnets, a single one piece armature extending longitudinally of the element and connected at one end thereto on the other side of the application of force thereto, the other end of the armature being spaced from the element and closely facing said two electro-magnets, whereby bending the element moves the armature relatively to the magnets, toward one and from the other, and thereby varies a current passed through the coils.

4. In combination, a longitudinally extending beam-like element of substantially uniform cross-sectional area, the element being disposed to receive a force normal to a plane through its longitudinal center to bend it, a magnetic strain gage for measuring the bending moment of the force on said element comprising an arm of magnetic material extending longitudinally of the element and connected at one end thereto on one side of the application of force thereto, the other end of the arm being spaced from the element and terminating in spaced substantially parallel prongs, all lying in a plane at right angles to said first plane, two being equally spaced from said first plane, separate electric coils on said two prongs, the prongs and coils forming separate electro-magnets, a single one piece armature extending longitudinally of the element and connected at one end thereto on the other side of the application of force thereto, the other end of the armature being spaced from the element and closely facing said two electro-magnets forming air gaps between the armature and magnets, whereby bending the element moves the armature and magnets relatively to each other, to close one air gap therebetween and open the other, and thereby varies a current passed through the coils.

JAMES N. BAKER.

REFERENCES CITED

The following references are of record in the file of this patent:

UNITED STATES PATENTS

| Number | Name | Date |
|---|---|---|
| 2,242,011 | Frey et al. | Sept. 10, 1940 |
| 2,213,982 | Mahmberg | May 13, 1941 |
| 2,276,817 | Bagno | Mar. 17, 1942 |
| 2,319,299 | Converse | May 18, 1943 |
| 2,336,371 | Shayne et al. | Dec. 7, 1943 |
| 2,411,023 | Bruns | Nov. 12, 1946 |
| 2,421,626 | Kuehni | June 3, 1947 |